US007658315B2

(12) United States Patent
Budinger et al.

(10) Patent No.: US 7,658,315 B2
(45) Date of Patent: Feb. 9, 2010

(54) PROCESS OF BRAZING SUPERALLOY COMPONENTS

(75) Inventors: David Edwin Budinger, Loveland, OH (US); Ronald Lance Galley, Mason, OH (US); Nripendra Nath Das, West Chester, OH (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 11/306,711

(22) Filed: Jan. 9, 2006

(65) Prior Publication Data

US 2007/0158398 A1 Jul. 12, 2007

(51) Int. Cl.
*B23K 35/12* (2006.01)

(52) U.S. Cl. ....................... 228/246; 228/175; 228/208; 228/248.1; 148/528; 428/615; 428/680

(58) Field of Classification Search ................. 228/223, 228/224, 245, 248.1, 175, 208, 246; 148/528; 428/615, 680
See application file for complete search history.

(56) References Cited

U.S. PATENT DOCUMENTS 3,293,072 A * 12/1966 Doolittle et al. ............. 428/430
4,566,939 A 1/1986 Miller et al. ................ 156/655
5,102,031 A 4/1992 Heitman et al. ............. 228/175
5,263,641 A 11/1993 Rafferty et al. ............. 228/220
5,348,215 A 9/1994 Rafferty et al. ............. 228/181
5,359,770 A * 11/1994 Brown et al. ............... 29/889.1
6,527,165 B1 * 3/2003 Budinger et al. ............ 228/226
2002/0189722 A1 * 12/2002 Hasz et al. .................. 148/528

* cited by examiner

*Primary Examiner*—Jessica L. Ward
*Assistant Examiner*—Devang Patel
(74) *Attorney, Agent, or Firm*—William Scott Andes; Gary M. Hartman; Domenica N. S. Hartman

(57) ABSTRACT

A process for brazing components formed of superalloys that contain elements prone to oxidation during brazing. At least one braze tape is applied to at least one faying surface of at least a first of the components being joined by brazing. The braze tape comprises a braze tape alloy containing the base metal of the superalloys and a melting point suppressant, and is applied so as to substantially cover the faying surface. The braze tape is then bonded to the faying surface by heating the first component to a temperature not exceeding the brazing temperature required to join the components. Thereafter, the components are assembled so that the bonded braze tape are between the respective faying surfaces of the components. The components are then brazed together by applying and heating a braze alloy to the braze temperature.

20 Claims, 1 Drawing Sheet

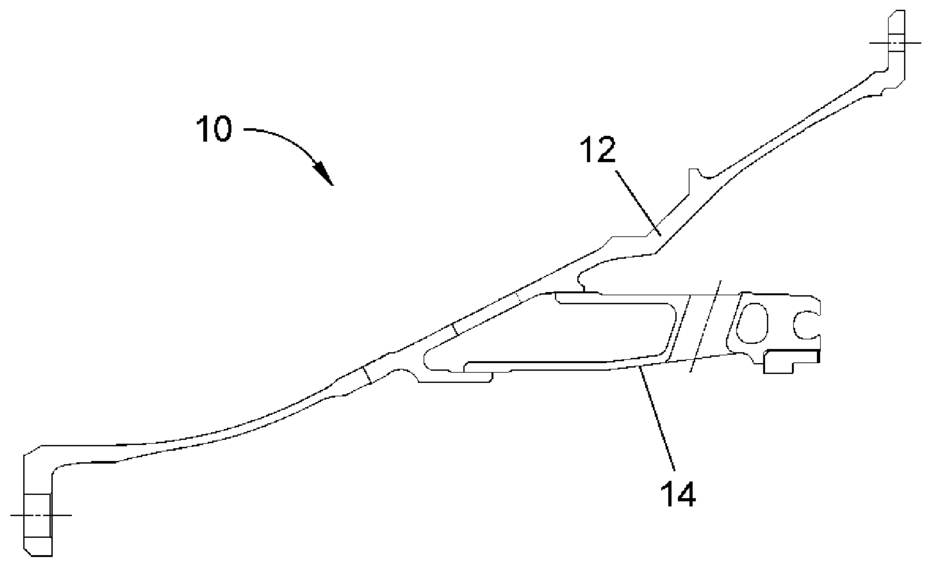
FIG. 1
FIG. 2
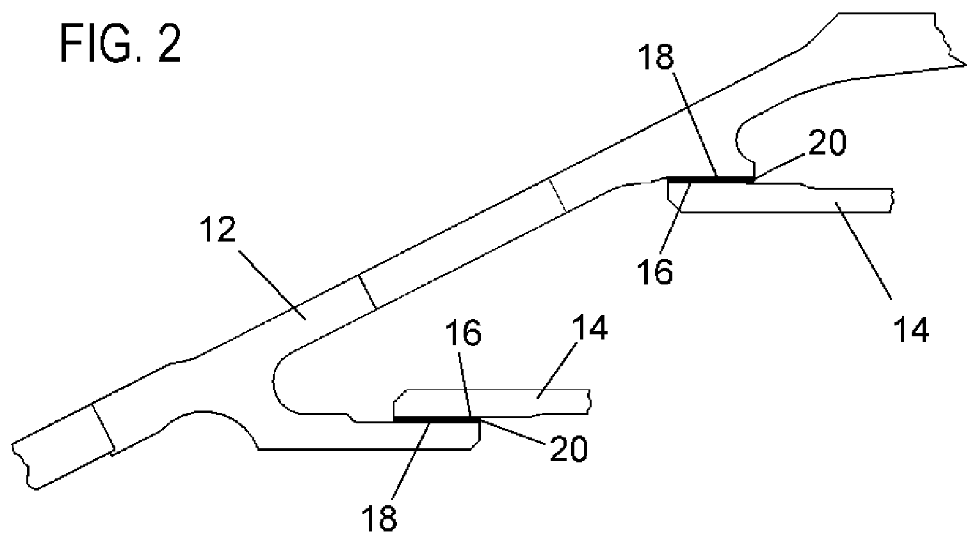

PROCESS OF BRAZING SUPERALLOY COMPONENTS

BACKGROUND OF THE INVENTION

This invention generally relates to brazing methods for use with superalloys. More particularly, this invention relates to a brazing process employing a braze tape to inhibit oxidation of the faying surfaces of components being joined during a brazing process.

Nickel, cobalt, and iron-base superalloys are widely used to form high temperature components of gas turbine engines. While some high-temperature superalloy components can be formed by a single casting, others are preferably or required to be fabricated by a joining operation. As an example, a high pressure turbine nozzle assembly may be structurally supported by a nozzle support assembly formed by brazing a number of individual nickel-base superalloy members. In carrying out the brazing process, an appropriate braze alloy is placed between the interface (faying) surfaces to be joined, and the faying surfaces and the braze alloy therebetween are heated to a temperature sufficient to melt the braze alloy without melting or causing grain growth in the superalloy base material. The braze alloy melts at a lower temperature than the superalloy base material as a result of containing a melting point suppressant such as boron. On cooling, the braze alloy solidifies to form a permanent metallurgical bond.

Because gas turbine engine components must operate in a thermally hostile environment that requires resistance to oxidation, superalloys typically contain aluminum, titanium, iron, and/or niobium that, in addition to contributing to the mechanical properties, form tenacious oxides that inhibit oxidation of the superalloy. Unfortunately, if a superalloy contains a sufficient amount of these metals individually or in combination (e.g., by weight, more than 0.4% aluminum, more than 0.7% titanium, or more than 0.7% Ti+Al), these protective oxides can hinder brazing of the superalloy by preventing the braze alloy from adequately wetting the surface of the superalloy. Because the braze alloy does not adequately flow onto the superalloy base material, uniform and complete brazing is not achieved.

As a solution, the faying surfaces of nickel-base superalloy components have been plated with nickel prior to the brazing operation. The nickel plating improves the brazeability of a superalloy by preventing oxide formation in those regions that are to be bonded, thereby enhancing the wetting action of the braze alloy. Such a process typically involves masking a superalloy component to expose only those surfaces to be plated, and then depositing a layer of nickel using an electrochemical plating technique. However, nickel electroplating processes have several shortcomings, including being costly, labor intensive, time consuming, and environmentally unfriendly. Accordingly, it would be desirable if a brazing process existed that facilitated the brazing of superalloy components without the need for nickel plating the surfaces to be brazed.

BRIEF SUMMARY OF THE INVENTION

The present invention generally provides a process for brazing components formed of superalloys that contain elements prone to oxidation during brazing, resulting in the growth of an oxide film or scale on the superalloy, including its surfaces being joined by brazing if exposed during brazing. The process inhibits oxidation of the surfaces to be brazed while avoiding the prior practice of electroplating nickel, and therefore avoids the disadvantages associated with nickel electroplating processes.

The process of this invention generally entails applying at least a first braze tape to at least a first faying surface of a first of the components being joined by brazing. The first braze tape comprises a first braze tape alloy containing the base metal of the superalloys and a melting point suppressant, and is applied so as to substantially cover the first faying surface. The first braze tape is then bonded to the first faying surface by heating to a temperature not exceeding the brazing temperature required to join the first component to a second component. The first braze tape inhibits oxidation of the first faying surface during the bonding step. Thereafter, the first component is assembled with the second component so that the bonded first braze tape is between the first faying surface of the first component and a second faying surface of the second component. The first and second components are then brazed together by applying and heating a braze alloy to the braze temperature for a duration sufficient to melt the braze alloy and metallurgically bond the first and second faying surfaces, during which the bonded first braze tape inhibits oxidation of the first faying surface.

According to the invention, the first braze tape, whose braze tape alloy contains the base metal of the superalloys being joined, is metallurgically compatible with the superalloys as well as the braze alloy used to join the components, and therefore is able to form with the braze alloy a permanent metallurgical bond between the superalloys. Braze tapes of this invention can be more readily and quickly applied to the faying surface(s) to be joined than nickel plating, with the result that costs and processing time are reduced while achieving quality brazements. The braze tapes can also be produced in various shapes and sizes suitable for use with a variety of components.

Other objects and advantages of this invention will be better appreciated from the following detailed description.

BRIEF DESCRIPTION OF THE DRAWINGS

FIG. 1 is a cross-sectional view of a nozzle support assembly of a type that can brazed in accordance with the process of the present invention.

FIG. 2 is a detailed view showing the points of attachment of first and second members making up the nozzle support assembly of FIG. 1.

DETAILED DESCRIPTION OF THE INVENTION

The invention will be described with specific reference to a nozzle support assembly for a gas turbine engine, in which the assembly comprises members that are individually formed of a nickel-base superalloy and then brazed together. However, the invention has application to a variety of components and superalloys other than those discussed.

FIG. 1 represents a cross-section of a gas turbine engine nozzle support assembly 10 made up by joining multiple individual members. For the purpose of discussing this invention, at least two of the members 12 and 14 will be described as joined by brazing. Because of the hostile operating environment of the nozzle support, the members 12 and 14 are preferably formed of superalloy materials. In a particular embodiment of the invention, each member 12 and 14 is formed of a nickel-base superalloy, such as Inconel 718 (IN718) having a nominal composition of, by weight, about 19% chromium, about 3% molybdenum, about 18.5% iron, about 5.1% niobium, about 0.9% titanium, about 0.5% aluminum, about 0.15% copper, about 0.08% carbon, the balance nickel. IN718 is widely used as a material for a variety of structural applications in gas turbine engines, and contains a sufficient amount of aluminum and titanium to thermally grow a film of aluminum oxide (alumina) and/or titanium oxide (titania) when exposed to an oxidizing atmosphere. Brazing temperatures are sufficient to cause the growth of this oxide scale on IN718, which inhibits wetting by a braze alloy to the extent that a reliable metallurgical bond cannot be obtained. As such, faying surfaces 16 and 18 of the members 12 and 14 intended to be brazed together cannot be brazed unless growth of the oxide scale is suppressed. Even if brazing is performed in a protective atmosphere such as under vacuum, superalloys such as IN718 that contain, by weight, more than 0.4% aluminum, more than 0.7% titanium, or more than 0.7% Ti+Al, as well as superalloys containing sufficient amounts iron and/or niobium, tend to form sufficient oxide scale to inhibit wetting and metallurgical joining.

As a solution, the present invention bonds at least one braze tape 20 to at least one of the faying surfaces 16 and 18 to be brazed, as represented in FIG. 2. In a preferred embodiment, each faying surface 16 and 18 of the members 12 and 14, respectively, is individually protected with a braze tape 20, and each tape 20 sufficiently overlays its respective surfaces 16 or 18 to prevent oxidation during process steps carried out to apply the tapes 20 and braze the members 12 and 14.

Braze tapes 20 of this invention preferably contain an alloy whose base metal is the same as the base metal of the superalloy to be brazed, e.g., nickel if the members 12 and 14 are formed of IN718, but with a melting temperature below the grain growth and incipient melting temperature of the superalloy to be brazed. The braze tape alloy can be identical or different from the braze alloy that will eventually be applied and melted to braze the members 12 and 14 of the nozzle support assembly 10. The braze tape alloy preferably contains a melting point suppressant that sufficiently lowers the melting temperature of the tape 20 to permit its bonding to the faying surfaces 16 and 18 at a temperature not higher than the brazing temperature that will be used to perform the brazing operation. As an example, suitable nickel-base braze tape alloys contain as melting point suppressants up to about 3.5 weight percent boron, up to about 10 weight percent silicon, or lesser levels if both boron and silicon are present. The balance of such braze tape alloys is nickel and preferably strengtheners and/or environmental resistance promoters such as chromium, etc. A particularly suitable commercially-available alloy for use with this invention is AMS 4777, having a nominal composition of, by weight, about 7% chromium, about 4% silicon, about 3% boron, about 3% iron, about 0.06% carbon, and the balance nickel and incidental impurities. Other commercially-available alloys believed to be suitable for the braze tapes 20 of this invention when brazing nickel-base superalloys include AMS 4778, AMS 4779, and AMS 4782. If AMS 4777 is used as the alloy for both the braze tapes 20 and the braze alloy, the braze tapes 20 can be bonded to the faying surfaces 16 and 18 of the members 14 and 16 at a temperature between the solidus and liquidus temperatures of AMS 4777, for example, in a range of about 1840° F. to about 1870° F. (about 1004° C. to about 1021° C.), and the braze tapes 20 and braze alloy can be rendered completely molten during the brazing operation at a temperature at or above the liquidus temperature of AMS 4777, preferably about 1875° F. to about 1925° F. (about 1024° C. to about 1050° C.).

In the manufacture of braze tapes 20 for use with this invention, the braze tape alloy is preferably in powder form with a preferred particle size range of −325 mesh (45 micrometers maximum). This powder can be combined with a binder to form a slurry or paste that can be dried to yield the braze tape 20. Suitable compositions for the binder are believed to be polymeric or organic binders capable of burning off at a temperature of not higher than the intended brazing temperature to leave no undesirable residues. The resulting braze tapes 20 are then applied and bonded to their intended faying surfaces 16 and 18. The bonding temperature, which as noted above is preferably between the solidus and liquidus temperature of the braze tape alloy, is sufficient to sinter (fuse) the powder particles and burn off the binder, as well as at least partially diffuse the bond tape alloy into the faying surfaces 16 and 18. Bonding is preferably preformed in an inert or low pressure atmosphere, such as a vacuum level not exceeding about one micrometer Hg (about $1.33\times10^{-3}$ mbar).

One or more braze tapes 20 of this invention are preferably applied to entirely cover each of the faying surfaces 16 and 18 of the members 12 and 14. Depending on the particular application and the surface area of the available faying surface 16 or 18, it is possible that suitable brazements could be formed by covering less than the entire faying surface 16 or 18, though it is believed that in most applications a substantial portion, e.g., at least 80%, of each faying surface 16 and 18 should be covered by a braze tape 20. Suitable thicknesses for the braze tapes 20 will also vary depending on the particular application. For the nozzle support members 12 and 14 represented in FIG. 1, a suitable thickness range is believed to be about 3 to about 8 mils (about 75 to 200 micrometer).

Once the braze tapes 20 are bonded to their faying surfaces 16 and 18, brazing of the members 12 and 14 can be performed with a suitable braze alloy. In a preferred embodiment, the members 12 and 14 are first tack welded together, such that the braze tapes 20 on each opposing pair of faying surfaces 16 and 18 abut. Thereafter, a suitable braze paste containing the desired braze alloy can be applied to one side of the interface between the braze tapes 20, such that during brazing the molten braze alloy is drawn by capillary action through the interface between the tapes 20. As with the braze tape alloy, the braze alloy preferably is formed to have the same base metal is that of the superalloy to be brazed, e.g., nickel if the members 12 and 14 are formed of IN718 or another nickel-base superalloy, but with a melting temperature below the grain growth and incipient melting temperature of the superalloy. As previously noted, the braze alloy can be, though is not required to be, identical in composition to the braze tape alloy. During brazing, the resulting assembly is heated to a temperature and for a duration sufficient to completely melt the braze alloy and the braze tapes 20 to metallurgically join the faying surfaces 16 and 18 and, therefore, the members 12 and 14. Similar to the bonding and sintering step, brazing is preferably preformed in an inert or low pressure atmosphere, such as a vacuum level not exceeding about one micrometer Hg (about $1.33\times10^{-3}$ mbar).

In an investigation leading up to the invention, braze tapes were formed from a powder of the AMS 4777 alloy and a binder to have a thickness of about 0.005 inch (about 25 micrometers). The tapes were placed on test specimens formed of the IN718 nickel-base superalloy to provide greater than 95% surface coverage of faying surfaces of the specimens. The tapes were then sintered and bonded to the test specimens at temperatures in the range of about 1840° F. to 1870° F. (about 1004° C. to about 1021° C.) for a duration of about five to ten minutes in a vacuum of up to about one micrometer Hg (about $1.33\times10^{-3}$ mbar). Each specimen was then paired and assembled with another of the specimens, a braze paste of the AMS 4777 braze alloy was applied to the interface between the mated braze tapes, and the specimens were brazed together by heating to temperatures in the range of about 1875° F. to 1900° F. (about 1024° C. to about 1040° C.) for a duration of about four minutes in a vacuum of up to about one micrometer Hg (about $1.33\times10^{-3}$ mbar). Visual and metallographic evaluation of the brazed specimens evidenced that the resulting brazements were structurally sound, with the absence of through voids and void contents of less than five volume percent.

While the invention has been described in terms of a preferred embodiment, it is apparent that other forms could be adopted by one skilled in the art. Accordingly, the scope of the invention is to be limited only by the following claims.

What is claimed is:

1. A process of brazing first and second faying surfaces of first and second components, respectively, formed of superalloys containing a base metal and at least one metal capable of forming an oxide on the first and second faying surfaces if the first and second components are exposed to a brazing temperature, the process comprising the steps of:

forming a first braze tape by combining a binder and a powder of a first braze tape alloy containing the base metal of the superalloys and a melting point suppressant so as to have solidus and liquidus temperatures;

applying at least the first braze tape to at least the first faying surface of the first component, the first braze tape substantially covering the first faying surface;

heating the first braze tape to a temperature above the solidus temperature of the first braze tape alloy but below the liquidus temperature of the first braze tape alloy, the heating step burning off the binder, sintering the powder of the first braze tape alloy, and at least partially diffusing the first braze tape alloy into the first faying surface to form thereon a first bonded braze tape alloy, the first bonded braze tape alloy inhibiting oxidation of the first faying surface during the bonding step;

assembling the first and second components and applying a braze alloy so that the first bonded braze tape alloy is between the first and second faying surfaces and the braze alloy is present at an interface defined between the first braze tape and the second faying surface; and brazing the first and second components together by heating the braze alloy to at least the liquidus temperature of the first braze tape alloy and to the brazing temperature for a duration sufficient to melt the braze alloy and the first braze tape alloy and metallurgically bond the first faying surface to the second faying surface, the first bonded braze tape alloy inhibiting oxidation of the first faying surface during the brazing step.

2. The process according to claim 1, wherein the base metal is nickel.

3. The process according to claim 2, wherein the braze alloy is a nickel-base alloy.

4. The process according to claim 1, further comprising the steps of:

forming a second braze tape by combining a binder and a powder of a second braze tape alloy containing the base metal of the superalloys and a melting point suppressant so as to have solidus and liquidus temperatures;

applying at least the second braze tape to the second faying surface of the second component, the second braze tape substantially covering the second faying surface; and heating the second braze tape to a temperature above the solidus temperature of the second braze tape alloy but below the liquidus temperature of the second braze tape alloy, the heating step burning off the binder, sintering the powder of the second braze tape alloy, and at least partially diffusing the second braze tape alloy into the second faying surface to form thereon a second bonded braze tape alloy, the second bonded braze tape alloy inhibiting oxidation of the second faying surface during the bonding step;

wherein the second bonded braze tape alloy inhibits oxidation of the second faying surface during the brazing step.

5. The process according to claim 4, wherein the second braze tape alloy is identical to the first braze tape alloy.

6. The process according to claim 4, wherein the base metal is nickel.

7. The process according to claim 6, wherein the braze alloy is a nickel-base alloy.

8. The process according to claim 1, wherein the superalloys of the first and second components are identical.

9. The process according to claim 1, wherein the first braze tape alloy is identical to the braze alloy.

10. The process according to claim 1, wherein the first braze tape alloy is different from the braze alloy.

11. The process according to claim 1, wherein the first braze tape covers more than 80% of the first faying surface.

12. The process according to claim 1, wherein the first braze tape alloy consists essentially of, by weight, about 7% chromium, about 4% silicon, about 3% boron, about 3% iron, about 0.06% carbon, and the balance nickel and incidental impurities.

13. The process according to claim 1, wherein the at least one metal capable of forming an oxide is at least one metal chosen from the group consisting of aluminum, titanium, iron, and niobium.

14. The process according to claim 1, wherein the first and second components are members of a nozzle support assembly of a gas turbine engine.

15. A process of brazing first and second faying surfaces of first and second members, respectively, of a nozzle support assembly, the first and second members being formed of nickel-base superalloys containing at least one of aluminum, titanium, iron, and niobium in an amount sufficient to form an oxide scale on the first and second faying surfaces if the first and second members are exposed to a brazing temperature, the process comprising the steps of:

preparing first and second braze tapes by combining a binder and a powder of a nickel-base braze tape alloy containing a melting point suppressant and having solidus and liquidus temperatures;

applying at least the first braze tape to the first faying surface of the first member and at least the second braze tape to the second faying surface of the second member, the first braze tape substantially covering the first faying surface and the second braze tape substantially covering the second faying surface;

heating the first and second braze tapes to a temperature below the liquidus temperature of the braze tape alloy but above the solidus temperature of the braze tape alloy and sufficient to burn off the binder, sinter the powder, and at least partially diffuse the braze tape alloy into the first and second faying surfaces to form thereon first and second bonded braze tape alloys, respectively, the first and second bonded braze tape alloys inhibiting oxidation of the first and second faying surfaces during the heating step;

assembling the first and second members and applying a nickel-base braze alloy so that the first and second bonded braze tape alloys are between the first and second faying surfaces and the braze alloy is present at an interface defined between the first and second bonded braze tape alloys; and brazing the first and second members together by heating the braze alloy and the first and second bonded braze tape alloys to at least the liquidus temperature of the braze tape alloy and to the brazing temperature for a duration sufficient to melt the braze alloy and the braze tape alloy and metallurgically bond the first faying surface to the second faying surface, the first and second bonded braze tape alloys inhibiting oxidation of the first and second faying surfaces during the brazing step.

16. The process according to claim 15, wherein the second braze tape alloy is identical to the first braze tape alloy.

17. The process according to claim 15, wherein the superalloys of the first and second members are identical.

18. The process according to claim 15, wherein the first and second braze tape alloys are identical to the braze alloy.

19. The process according to claim 15, wherein the first and second braze tape alloys are different from the braze alloy.

20. The process according to claim 15, wherein the first and second braze tapes cover more than 80% of the first and second faying surfaces, respectively.

* * * * *